United States Patent
Sawant et al.

(10) Patent No.: US 12,292,246 B2
(45) Date of Patent: May 6, 2025

(54) METHODS OF MANUFACTURING HEAT EXCHANGER SYSTEMS

(71) Applicant: Johnson Controls Tyco IP Holdings LLP, Milwaukee, WI (US)

(72) Inventors: Hambirarao Sayajirao Sawant, Pune (IN); Anthony Joseph Reardon, Norman, OK (US); Prasad Prakash Joshi, Pune (IN); Dnyaneshwar Gorakshanath Rokade, Pune (IN)

(73) Assignee: TYCO FIRE & SECURITY GMBH, Neuhausen Am Rheinfall (CH)

(*) Notice: Subject to any disclaimer, the term of this patent is extended or adjusted under 35 U.S.C. 154(b) by 419 days.

(21) Appl. No.: 17/541,076

(22) Filed: Dec. 2, 2021

(65) Prior Publication Data
US 2023/0175792 A1 Jun. 8, 2023

(51) Int. Cl.
*B23P 15/26* (2006.01)
*F28F 9/013* (2006.01)
*F28F 9/26* (2006.01)

(52) U.S. Cl.
CPC ............ *F28F 9/26* (2013.01); *B23P 15/26* (2013.01); *F28F 9/0131* (2013.01)

(58) Field of Classification Search
CPC ...................................................... B23P 15/26
See application file for complete search history.

(56) References Cited

U.S. PATENT DOCUMENTS

| | | | | |
|---|---|---|---|---|
| 3,820,215 A * | 6/1974 | Pasternak et al. | ....... | B21D 7/08 72/170 |
| 5,267,610 A * | 12/1993 | Culbert | ....... | F28F 1/32 29/890.047 |
| 5,613,554 A * | 3/1997 | Bull | ....... | F28F 9/26 165/145 |
| RE46,343 E | 3/2017 | Des Champs | | |
| 9,618,229 B2 | 4/2017 | Shiborino | | |
| 10,415,886 B2 | 9/2019 | Choi | | |
| 10,514,046 B2 | 12/2019 | Stauter et al. | | |
| 11,022,380 B2 | 6/2021 | Zhao et al. | | |
| 2017/0356700 A1* | 12/2017 | Joardar | ....... | F28F 19/006 |
| 2020/0088451 A1 | 3/2020 | Saito et al. | | |

FOREIGN PATENT DOCUMENTS

| | | | |
|---|---|---|---|
| CN | 109719217 A | * | 5/2019 |
| JP | 2013113468 A | | 6/2013 |

OTHER PUBLICATIONS

English Machine Translation of CN-109719217-A (Year: 2019).*

* cited by examiner

*Primary Examiner* — Sarang Afzali
(74) *Attorney, Agent, or Firm* — Fletcher Yoder, PC

(57) ABSTRACT

A method of manufacturing a heat exchanger includes providing a first slab having a first plurality of tubes extending from a first end to a second end of the first slab along a first length of the first slab. The method includes providing a second slab having a second plurality of tubes extending from a third end to a fourth end of the second slab along a second length of the second slab. The method includes positioning a first face of the first slab adjacent to a second face of the second slab in a side-by-side configuration and securing a connector to the first end of the first slab and to the third end of the second slab in the side-by-side configuration. The method includes bending the first slab and the second slab together in the side-by-side configuration to form a bent configuration of the heat exchanger.

17 Claims, 16 Drawing Sheets

METHODS OF MANUFACTURING HEAT EXCHANGER SYSTEMS

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are utilized in residential, commercial, and industrial environments to control environmental properties, such as temperature, humidity, and/or air quality, for occupants of the respective environments. The HVAC system may regulate the environmental properties through delivery of a conditioned air flow to the environment. For example, the HVAC system may include an HVAC unit (e.g., a heat pump) that is fluidly coupled to various rooms or spaces within the building via an air distribution system, such as a system of ductwork. The HVAC unit includes heat exchangers that cooperate to enable generation of the conditioned air flow (e.g., heated air, cooled air, dehumidified air) and typically includes a fan or blower that is operable to direct the conditioned air flow through the ductwork and into the spaces to be conditioned. In this manner, the HVAC unit facilitates regulation of environmental parameters within the rooms or spaces of the building. Unfortunately, traditional heat exchangers may be limited by various constraints and may be difficult or unfeasible to mount in spatially constrained areas of the HVAC unit.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a method of manufacturing a heat exchanger. The method includes providing a first slab having a first plurality of tubes extending through a first plurality of fins. The first plurality of tubes extends from a first end to a second end of the first slab along a first length of the first slab. The first slab includes a first face that extends along the first length between the first end and the second end. The method also includes providing a second slab having a second plurality of tubes extending through a second plurality of fins. The second plurality of tubes extends from a third end to a fourth end of the second slab along a second length of the second slab. The second slab includes a second face that extends along the second length between the third end and the fourth end. The method also includes positioning the first face of the first slab adjacent to the second face of the second slab in a side-by-side configuration and securing a connector to the first end of the first slab and to the third end of the second slab in the side-by-side configuration. The method also includes, after securing the connector, bending the first slab and the second slab together in the side-by-side configuration to form a bent configuration of the heat exchanger, where the second end of the first slab and the fourth end of the second slab are aligned with one another in the bent configuration.

The present disclosure also relates to a heat exchanger that includes a first heat exchanger slab having a first plurality of tubes extending through a first plurality of fins along a first length. The first heat exchanger slab includes a first face extending along the first length between a first end of the first heat exchanger slab and a second end of the first heat exchanger slab. The heat exchanger also includes second heat exchanger slab having a second plurality of tubes extending through a second plurality of fins along a second length. The second heat exchanger slab includes a second face extending along the second length between a third end of the second heat exchanger slab and a fourth end of the second heat exchanger slab. The first face is disposed adjacent to the second face to position the first heat exchanger slab and the second heat exchanger slab in a side-by-side configuration. The first heat exchanger slab and the second heat exchanger slab are bent along the first length and the second length. The heat exchanger also includes a connector coupled to the first end of the first heat exchanger slab and to the third end of the second heat exchanger slab. The connector is a single piece component having a plurality of openings formed therein. The first plurality of tubes extends through a first subset of the plurality of openings and the second plurality of tubes extends through a second subset of the plurality of openings.

The present disclosure also relates to a method of manufacturing a heat exchanger. The method includes providing a first slab having a first plurality of tubes extending from a first end to a second end of the first slab along a first length of the first slab. The first slab includes a first face extending along the first length between the first end and the second end. The method also includes providing a second slab having a second plurality of tubes extending from a third end to a fourth end of the second slab along a second length of the second slab. The second slab includes a second face extending along the second length between the third end and the fourth end. The method also includes positioning the first face of the first slab adjacent to the second face of the second slab in a side-by-side configuration, where, in the side-by-side configuration, the first end of the first slab is aligned with the third end of the second slab. The method also includes securing a connector to the first end of the first slab and to the third end of the second slab in the side-by-side configuration. The method also includes, after securing the connector, bending the first slab and the second slab together in the side-by-side configuration to form a bent configuration of the heat exchanger, where the second end of the first slab and the fourth end of the second slab are aligned with one another in the bent configuration.

BRIEF DESCRIPTION OF THE DRAWINGS

Various aspects of this disclosure may be better understood upon reading the following detailed description and upon reference to the drawings in which.

DETAILED DESCRIPTION

Figure 1:
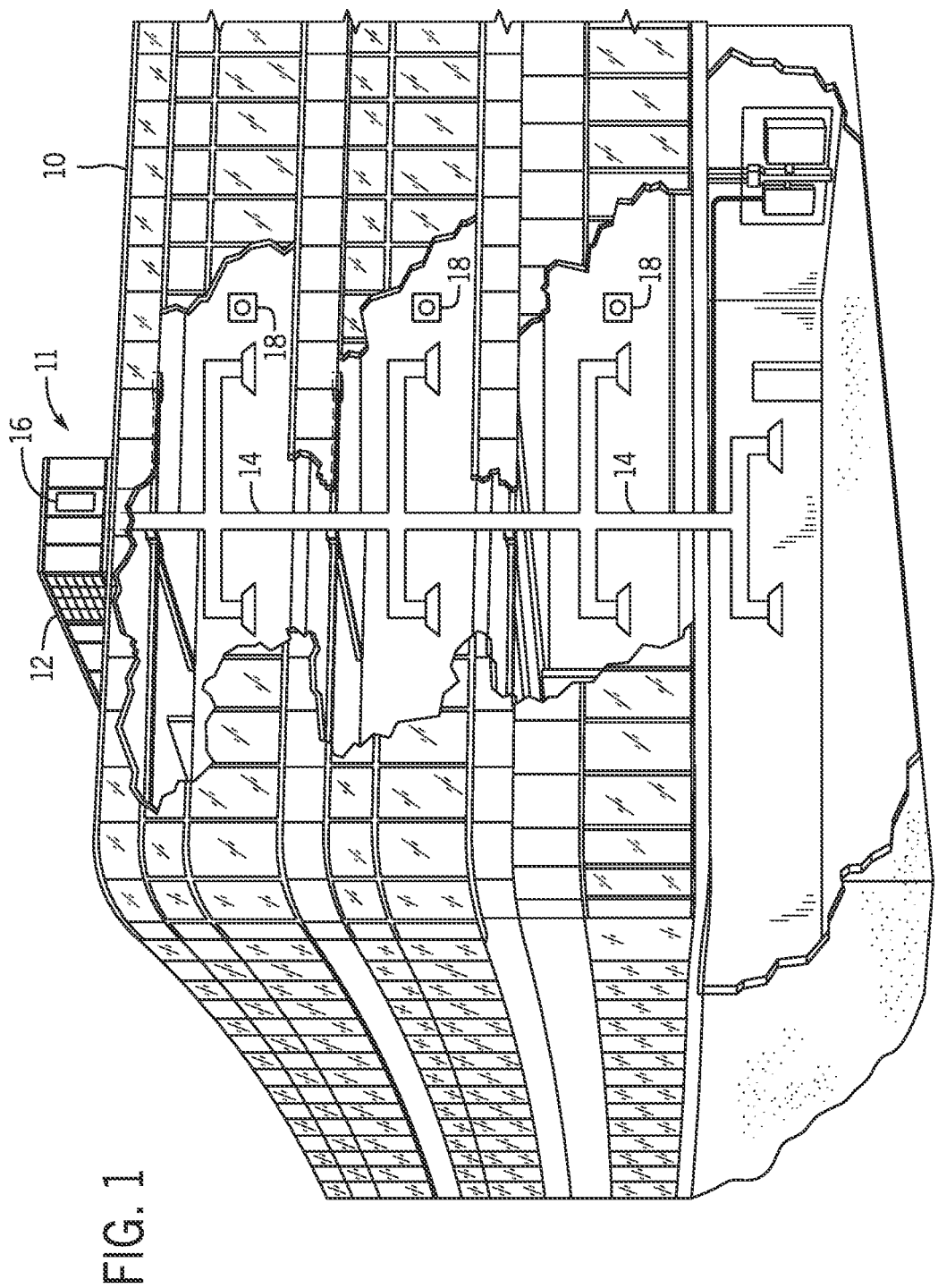
FIG. 1 is a perspective view of an embodiment of a building incorporating a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As briefly discussed above, a heating, ventilation, and/or air conditioning (HVAC) system may be used to thermally regulate a space within a building, home, or other suitable structure. For example, the HVAC system may include a vapor compression system that transfers thermal energy between a working fluid, such as a refrigerant, and a fluid to be conditioned, such as air. The vapor compression system includes heat exchangers, such as a condenser and an evaporator, which are fluidly coupled to one another via one or more conduits of a refrigerant loop or circuit. A compressor may be used to circulate the refrigerant through the conduits and other components of the refrigerant circuit (e.g., an expansion device) and, thus, enable the transfer of thermal energy between components of the refrigerant circuit (e.g., between the condenser and the evaporator) and one or more thermal loads (e.g., an environmental air flow, a supply air flow). Additionally or alternatively, the HVAC system may include a heat pump having a first heat exchanger (e.g., a heating and/or cooling coil, the evaporator), a second heat exchanger (e.g., a heating and/or cooling coil, the condenser), and a pump (e.g., the compressor) configured to circulate the working fluid (e.g., refrigerant) between the first and second heat exchangers to enable heat transfer between the thermal loads and an ambient environment (e.g., the atmosphere), for example.

It is presently recognized that it may be desirable to manufacture a heat exchanger assembly having a plurality of slabs (e.g., individual heat exchangers) arranged adjacent to one another in a side-by-side configuration to enable more space efficient packaging and mounting of such heat exchangers in the HVAC system. The plurality of slabs may also enable more efficient operation of the HVAC system via improved heat transfer between the working fluid circulated through the slabs and an air flow directed across the heat exchanger assembly. Moreover, it is presently recognized that it may be desirable to bend the slabs to increase an available heat transfer area of the individual heat exchangers in the heat exchanger assembly without increasing an overall exterior length of the heat exchanger assembly, as well as to facilitate mounting of the heat exchanger assembly in spatially constrained areas of the HVAC system. Accordingly, embodiments of the present disclosure are directed toward a heat exchanger assembly having multiple bent and adjacently arranged heat exchanger slabs to enable an enhanced heat transfer capacity of the heat exchanger assembly in a more space efficient manner.

For example, manufacture of the heat exchanger assembly discussed herein includes forming a first slab (e.g., a first heat exchanger) that includes a first plurality of tubes extending through a first plurality of fins (e.g., heat transfer fins). The first slab includes a first length dimension that extends from a first end of the first slab to a second end of the first slab. Manufacture of the heat exchanger assembly also includes forming a second slab (e.g., a second heat exchanger) that includes a second plurality of tubes extending through a second plurality of fins (e.g., heat transfer fins). The second slab includes a second length dimension that may be less than the first length dimension of the first slab and that extends from a third end of the second slab to a fourth end of the second slab. The first slab and the second slab may each be initially formed to have a linear or unbent configuration. While in the linear or unbent configuration, the first slab and the second slab may be positioned adjacent to one another in a side-by-side configuration, such that the first end of the first slab is aligned with the third end of the second slab. A connector may be coupled to the first end of the first slab and to the third end of the second slab to retain the first and second slabs adjacent (e.g., against) one another in the side-by-side configuration with the first length of the first slab extending linearly along the second length of the second slab. Manufacture of the heat exchanger assembly also includes bending the first slab and the second slab together to form a bent configuration of the heat exchanger assembly, in which the second end of the first slab and the fourth end of the second slab are aligned with one another in the bent configuration. As such, in the bent configuration, the lengths of the first and second slabs may include nonlinear profiles that extend along one another, where the first end of the first slab and the third end of the second slab, and the second end of the first slab and the fourth end of the second slab are respectively positioned adjacent to one another. These and other features will be described below with reference to the drawings.

Turning now to the drawings, FIG. 1 illustrates an embodiment of a heating, ventilation, and/or air conditioning (HVAC) system for environmental management that employs one or more HVAC units in accordance with the present disclosure. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by an HVAC system 11 that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, a heat pump, and/or a auxiliary heating unit.

The HVAC unit 12 may be air cooled device that implements a refrigeration cycle to provide conditioned air to the building 10. Specifically, the HVAC unit 12 may include one or more heat exchangers across which an air flow is passed to condition the air flow before the air flow is supplied to the building 10. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building 10 with one refrigeration circuit configured to operate in different modes. In other embodiments, the HVAC unit 12 may include one or more refrigeration circuits for cooling an air stream and a furnace for heating the air stream. The HVAC unit 12 includes a heat exchanger assembly 16 (e.g., see FIG. 16), also referred to herein as a "heat exchanger," in accordance with present embodiments, which will be discussed in detail below.

A control device 18, one type of which may be a thermostat, may be used to designate the temperature of the conditioned air. The control device 18 also may be used to control the flow of air through the ductwork 14. For example, the control device 18 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 18 may include computer systems that are integrated with or separate from other building control or monitoring systems, and even systems that are remote from the building 10.

Figure 2:
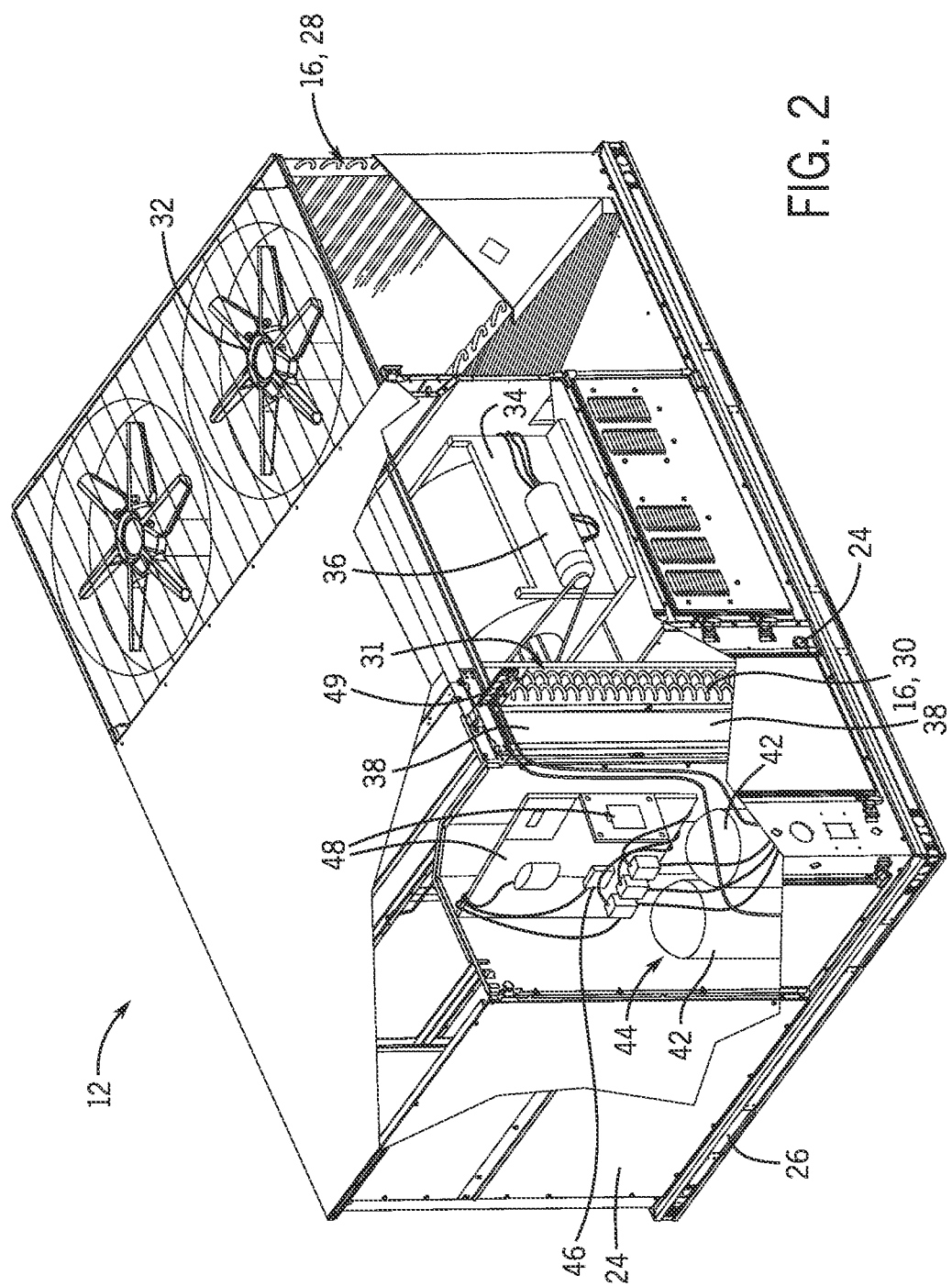
FIG. 2 is a perspective view of an embodiment of a packaged HVAC unit having a heat exchanger assembly, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 (e.g., an enclosure) encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Either or both of the heat exchangers 28 and/or 30 may include the heat exchanger assembly 16 in accordance with the embodiments discussed herein. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

In the illustrated embodiment, the heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air may flow through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 18. The control circuitry may be configured to control operation of the equipment, provide alarms, and monitor safety switches. Wiring 49 may connect the control board 48 and the terminal block 46 to the equipment of the HVAC unit 12.

Figure 3:
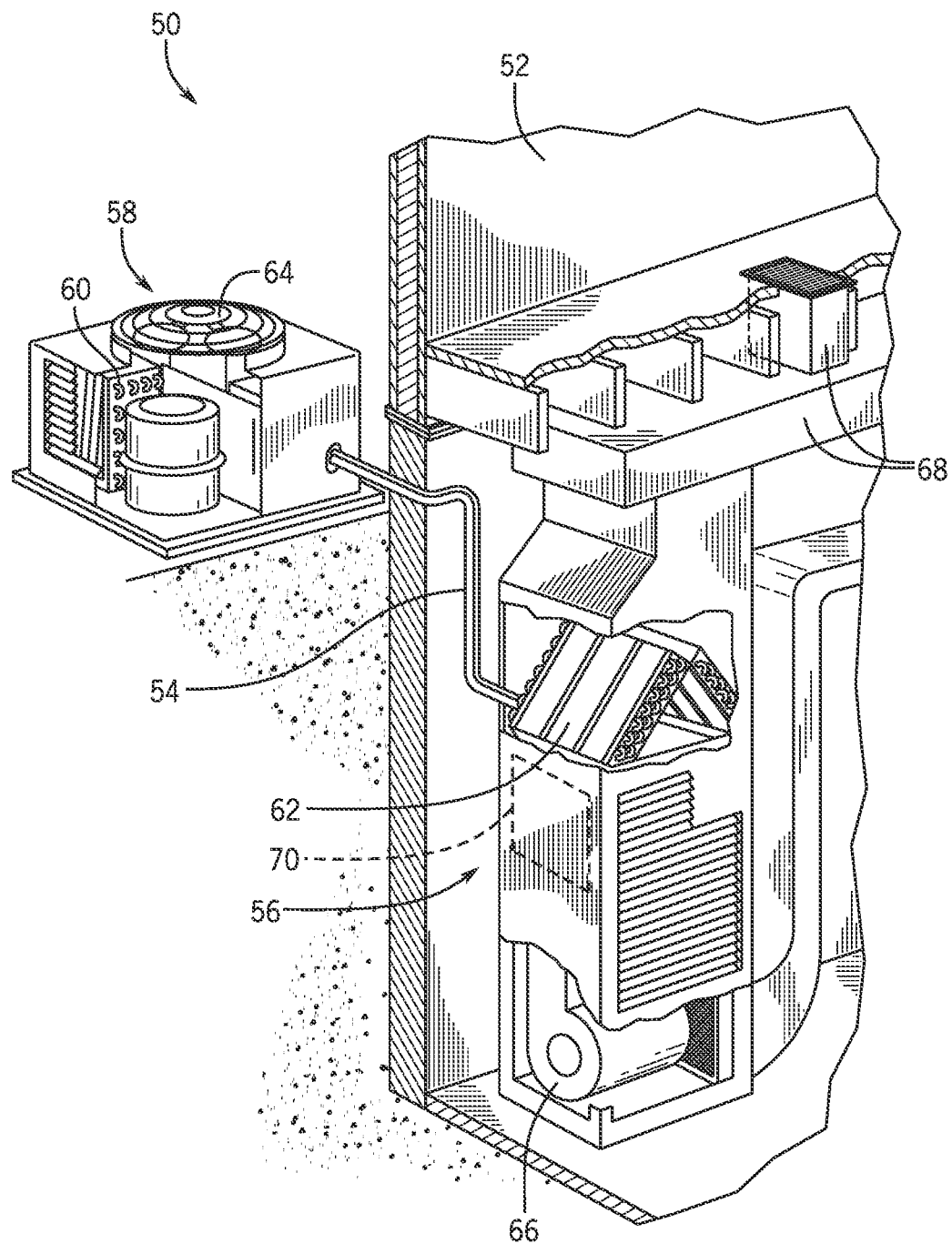
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
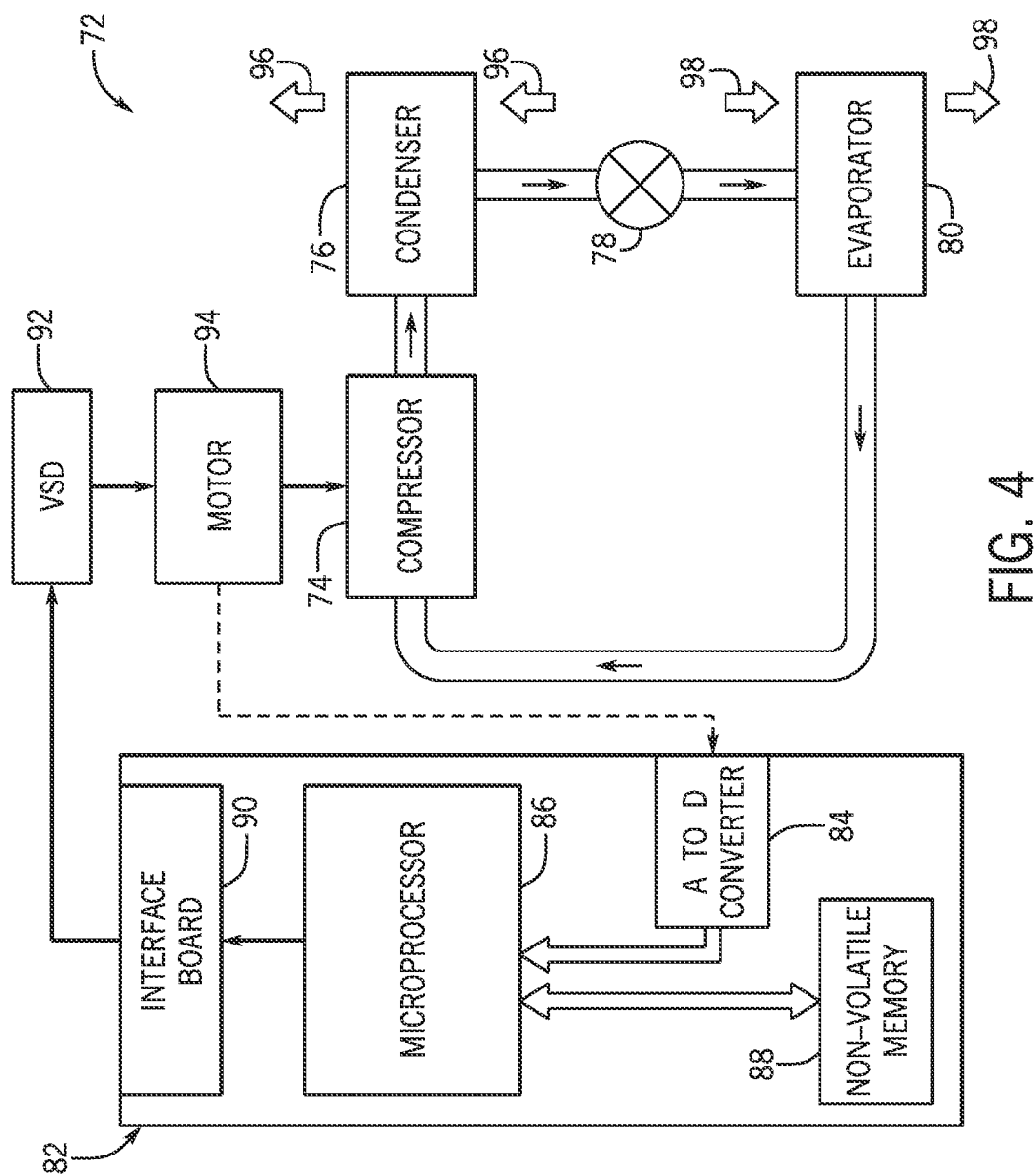
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
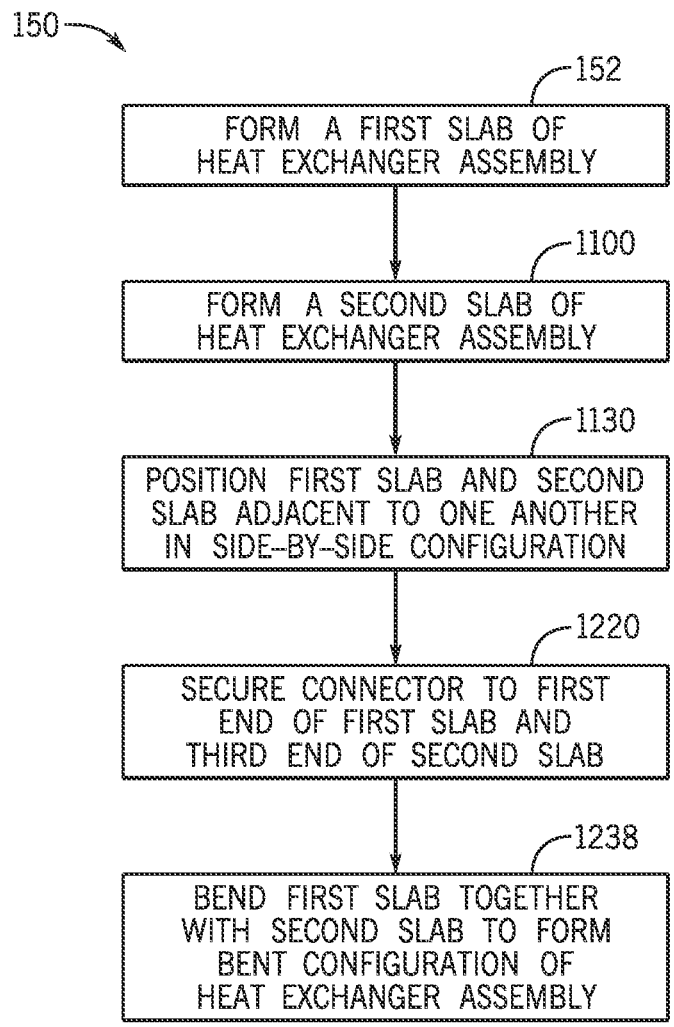
FIG. 5 is a flow diagram of an embodiment of a process for manufacturing a heat exchanger assembly, in accordance with an aspect of the present disclosure.

As discussed above, embodiments of the present disclosure are directed toward techniques for manufacturing, assembling, and/or otherwise producing the heat exchanger assembly 16. FIG. 5 is a flow diagram of an embodiment of a process 150 for manufacturing the heat exchanger assembly 16. For clarity, FIG. 5 will be discussed throughout and currently with FIGS. 6-17. As shown in the illustrated embodiment of FIG. 5, the process 150 includes forming a first slab of the heat exchanger assembly 16, as indicated by block 152. The following discussion continues with reference to FIG. 6, which is a perspective view of an embodiment of a first slab 154 (e.g., a first heat exchanger slab) of the heat exchanger assembly 16, and FIG. 7, which is a perspective view of an embodiment of a portion of the first slab 154. The first slab 154 may also be referred to herein as a "first heat exchanger" of the heat exchanger assembly 16. In some embodiments, the first slab 154 may be a round tube plate finned (RTPF) heat exchanger. For clarity, the heat exchanger assembly 16 and components thereof may be described with reference to a vertical axis 156, a longitudinal axis 158, and a lateral axis 160.

Figure 6:
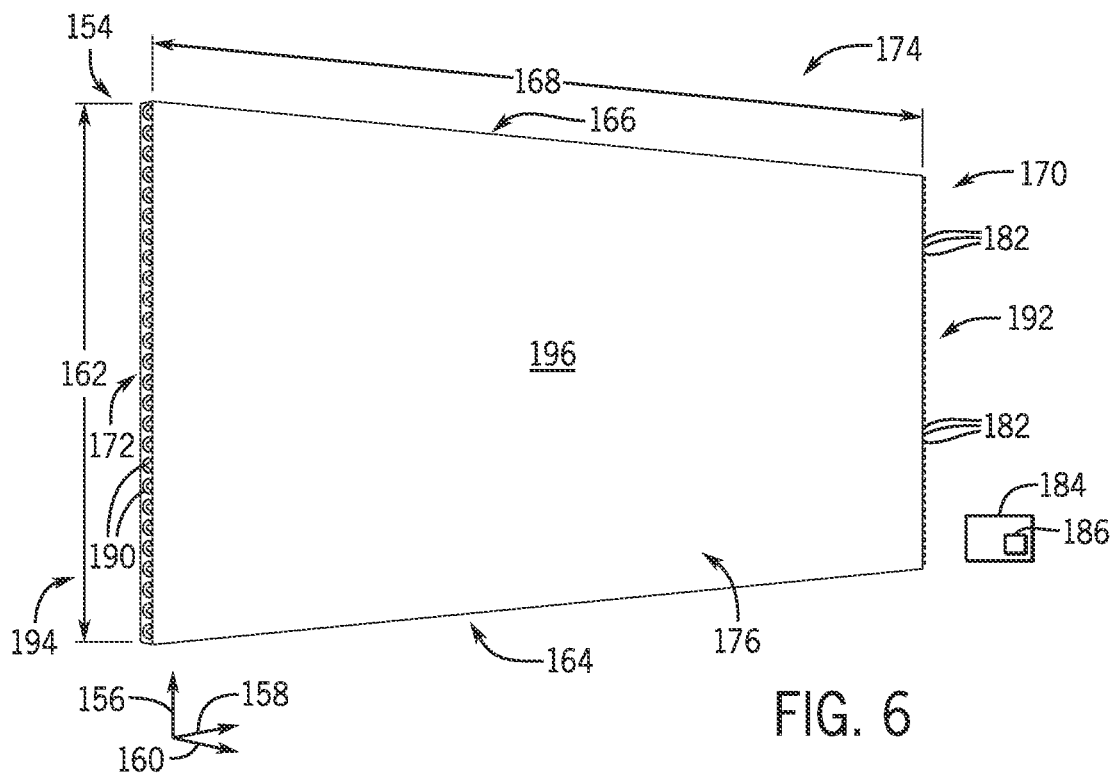
FIG. 6 is a perspective view of an embodiment of a first slab of a heat exchanger assembly, in accordance with an aspect of the present disclosure.
Figure 7:
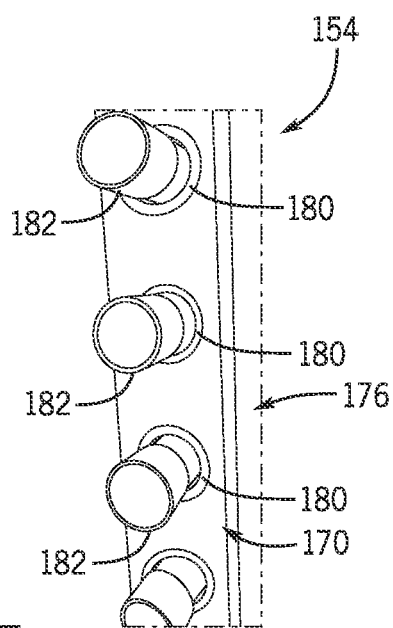
FIG. 7 is a perspective view of an embodiment of an end of a first slab of a heat exchanger assembly, in accordance with an aspect of the present disclosure.

As shown in the illustrated embodiment of FIG. 6, the first slab 154 includes a first height 162 that extends from a first side 164 (e.g., a base) of the first slab 154 to a second side 166 (e.g., a top) of the first slab 154 and includes a first length 168 that extends from a first end 170 of the first slab 154 to a second end 172 of the first slab 154. In the illustrated embodiment of FIG. 6, the first slab 154 is in an unbent configuration 1174 (e.g., a linear configuration), in which the first height 162 extends linearly along the vertical axis 156 from the first side 164 to the second side 166, and the first length 168 extends linearly along the longitudinal axis 158 from the first end 170 to the second end 172, for example. The first slab 154 includes a first plurality of fins 176 which may extend along a portion of or all of the first length 168 and/or the first height 162 of the first slab 154. Each fin 176 of the first plurality of fins 176 (e.g., a first fin stack of the first heat exchanger) includes a first plurality of openings 180 (see FIG. 7) formed therein. The first plurality of openings 180 may extend through the first plurality of fins 176 along the longitudinal axis 158 and be configured to receive a first plurality of tubes 182 of the first slab 154. As such, the first plurality of tubes 182 may extend through the first plurality of fins 176 (e.g., through the first plurality of openings 180) and between the first end 170 of the first slab 154 and the second end 172 of the first slab 154.

The first plurality of tubes 182 may be coupled to perimeters (e.g., diameters) of the first plurality of openings 180 via an interference fit generated utilizing a tube expander 184, for example. The tube expander 184 may include tooling 186 configured to extend into an interior of the first plurality of tubes 182 while the first plurality of tubes 182 is positioned within the first plurality of openings 180. The tube expander 184 may be configured to expand a portion of or all of each tube 182 of the first plurality of tubes 182 to increase outer diameters of the tubes 182 such that an outer perimeter of each of the tubes 182 contacts and engages with an inner perimeter of a corresponding opening 180 of the first plurality of openings 180. That is, the tube expander 184 may plastically deform (e.g., expand) at least a portion of each of the first plurality of tubes 182 to secure the first plurality of tubes 182 to the first plurality of fins 176 via an interference fit. However, in other embodiments, the first plurality of tubes 182 may be coupled to the first plurality of fins 176 (e.g., to corresponding perimeters of the first plurality of openings 180) via adhesives, a metallurgical process such as welding or brazing, or via another suitable technique.

In certain embodiments, corresponding ends of the first plurality of tubes 182 located at the second end 172 of the first slab 154 may be fluidly coupled to one another via a first plurality of joints 190 (e.g., u-shaped tubes). As discussed below, in this way, ends of the first plurality of tubes 182 at the first end 170 of the first slab 154 may form at least a portion of a first header side 192 of the first slab 154, while ends of the first plurality of tubes 182 at the second end 172 of the first slab 154 may form a first non-header side 194 of the first slab 154. In other embodiments, the first plurality of joints 190 may be omitted from the first slab 154. It should be understood that the first plurality of tubes 182 and the first plurality of fins 176 may collectively define a heat transfer area of the first slab 154. The first slab 154 includes a first face 196 that may extend between the first side 164, the second side 166, the first end 170, and the second end 172, and a second face 198 (see FIG. 16) that is positioned opposite the first face 196.

As shown in FIG. 5, the process 150 includes forming a second slab of the heat exchanger assembly 16, as indicated by block 1100. The following discussion continues with reference to FIG. 8, which is a perspective view of an embodiment of a second slab 1102 (e.g., a second heat exchanger slab) of the heat exchanger assembly 16, and FIG. 9, which is a perspective view of an embodiment of a portion of the second slab 1102. The second slab 1102 may also be referred to herein as a "second heat exchanger" of the heat exchanger assembly 16 and, similar to the first slab 154, may be an RTPF heat exchanger. The second slab 1102 includes a second height 1104 that extends from a third side 1106 of the second slab 1102 to a fourth side 1108 of the second slab 1102 and includes a second length 1110 that extends from a third end 1112 of the second slab 1102 to a fourth end 1114 of the second slab 1102.

Figure 8:
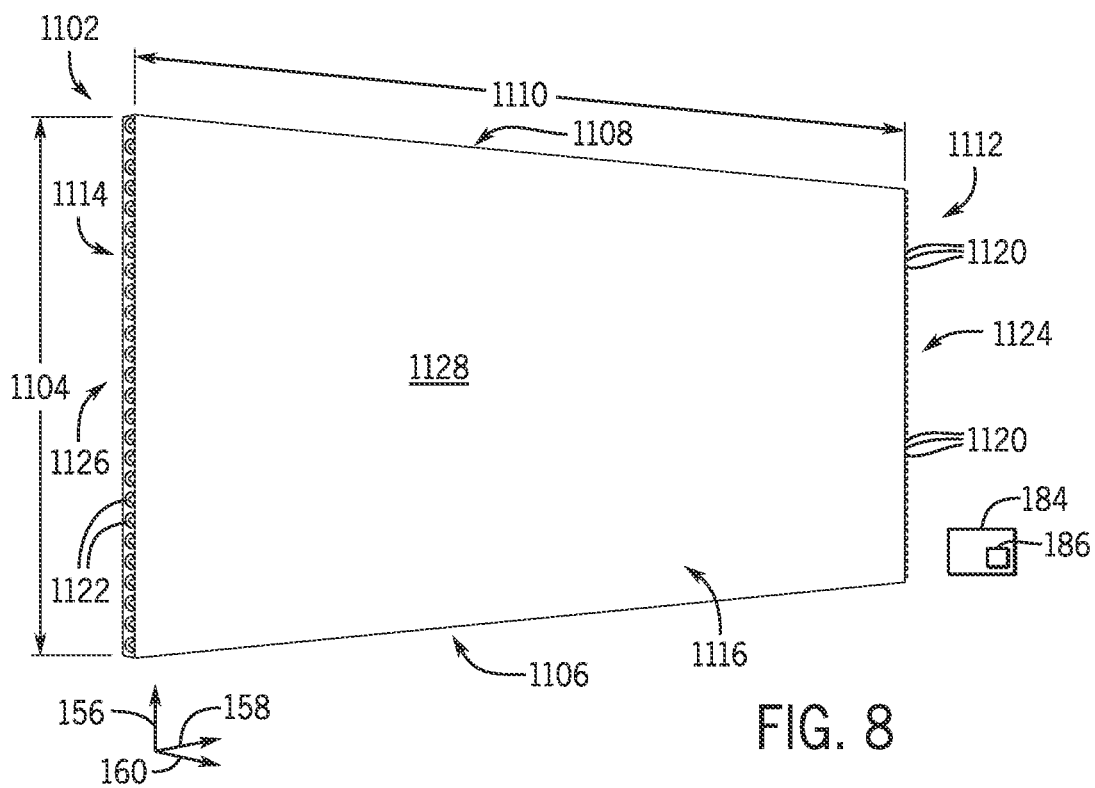
FIG. 8 is a perspective view of an embodiment of a second slab of a heat exchanger assembly, in accordance with an aspect of the present disclosure.
Figure 9:
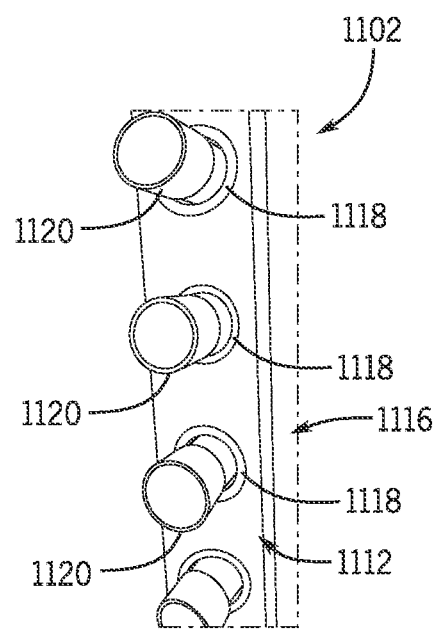
FIG. 9 is a perspective view of an embodiment of an end of a second slab of a heat exchanger assembly, in accordance with an aspect of the present disclosure.

In the illustrated embodiment of FIG. 8, the second slab 1102 is in an unbent configuration 1174 (e.g., a linear configuration), in which the second height 1104 extends linearly along the vertical axis 156 from the third side 1106 to the fourth side 1108, and the second length 1110 extends linearly along the longitudinal axis 158 from the third end 1112 to the fourth end 1114. The second slab 1102 includes a second plurality of fins 1116 which may extend along a portion of or all of the second length 1110 and/or the second height 1104 of the second slab 1102. Each fin 1116 of the second plurality of fins 1116 includes a second plurality of openings 1118 (see FIG. 9) formed therein. The second plurality of openings 1118 may extend through the second plurality of fins 1116 along the longitudinal axis 158 and be configured to receive a second plurality of tubes 1120 of the second slab 1102. As such, the second plurality of tubes 1120 may extend through the second plurality of fins 1116 (e.g., through the second plurality of openings 1118) and between the third end 1112 of the second slab 1102 and the fourth end 1114 of the second slab 1102. The second plurality of tubes 1120 may be coupled to perimeters (e.g., diameters) of the second plurality of openings 1118 via an interference fit generated utilizing the tube expander 184 in accordance with the techniques discussed above. However, in other embodiments, the second plurality of tubes 1120 may be coupled to the second plurality of fins 1116 (e.g., to corresponding perimeters of the second plurality of openings 1118) via adhesives, a metallurgical process such as welding or brazing, or via another suitable technique.

In certain embodiments, corresponding ends of the second plurality of tubes 1120 located at the fourth end 1114 of the second slab 1102 may be fluidly coupled to one another via a second plurality of joints 1122 (e.g., u-shaped tubes). As discussed below, in this way, ends of the second plurality of tubes 1120 at the third end 1112 of the second slab 1102 may form at least a portion of a second header side 1124 of the second slab 1102, while ends of the second plurality of tubes 1120 at the fourth end 1114 of the second slab 1102 may form a second non-header side 1126 of the second slab 1102. In other embodiments, the second plurality of joints 1122 may be omitted from the second slab 1102. It should be understood that the second plurality of tubes 1120 and the second plurality of fins 1116 may collectively define a heat transfer area of the second slab 1102. The second slab 1102 includes a third face 1128 that may extend between the third side 1106, the fourth side 1108, the third end 1112, and the fourth end 1114, and a fourth face 1129 (see FIG. 10) that is positioned opposite the third face 1128.

As shown in FIG. 5, the process 150 includes positioning the first slab 154 and the second slab 1102 adjacent to one another in a side-by-side configuration, as indicated by block 1130. The following discussion continues with reference to FIG. 10, which is a perspective view of an embodiment of a portion of the heat exchanger assembly 16, in which the first slab 154 and the second slab 1102 are positioned in a side-by-side configuration 1132. As shown in the illustrated embodiment of FIG. 10, in the side-by-side configuration 1132, the first slab 154 and the second slab 1102 are positioned adjacent to one another such that the first face 196 of the first slab 154 is positioned adjacent to (e.g., against) the fourth face 1129 of the second slab 1102, such that the first length 168 of the first slab 154 and the second length 1110 of the second slab 1102 each extend along the longitudinal axis 158, and such that the first height 162 of the first slab 154 the second height 1104 of the second slab 1102 each extend along the vertical axis 156. That is, in the side-by-side configuration 1132, the first length 168 of the first slab 154 may extend linearly along the second length 1110 of the second slab 1102. Further, in the side-by-side configuration 1132, the first end 170 of the first slab 154 may be positioned adjacent (e.g., within a threshold distance of) the third end 1112 of the second slab 1102. For example, the first slab 154 and the second slab 1102 may be positioned such that a first side face 1140 of the first end 170 is aligned (e.g., within a threshold degree of orientation, aligned along the lateral axis 160, etc.) with a second side face 1142 of the second slab 1102.

In some embodiments, the first end 170 of the first slab 154 includes a first end bracket 1150 and the third end 1112 of the second slab 1102 includes a second end bracket 1152. The first end bracket 1150 may be coupled to or formed integrally with the first plurality of fins 176 and the second end bracket 1152 may be coupled to or formed integrally with the second plurality of fins 1116. The first end bracket 1150 includes one or more first bracket openings 1154 formed therein and configured to receive at least a subset of the first plurality of tubes 182. The second end bracket 1152 includes one or more second bracket openings 1156 formed therein and configured to receive at least a subset of the second plurality of tubes 1120. In some embodiments, one or more of the first plurality of tubes 182 may be coupled to respective perimeters of the first bracket openings 1154 (e.g., using the tube expander 184) in addition to, or in lieu of, the first plurality of openings 180 of the first plurality of fins 176. Moreover, one or more of the second plurality of tubes 1120 may be coupled to respective perimeters of the second bracket openings 1156 (e.g., using the tube expander 184) in addition to, or in lieu of, the second plurality of openings of the second plurality of fins 1116.

Figure 10:
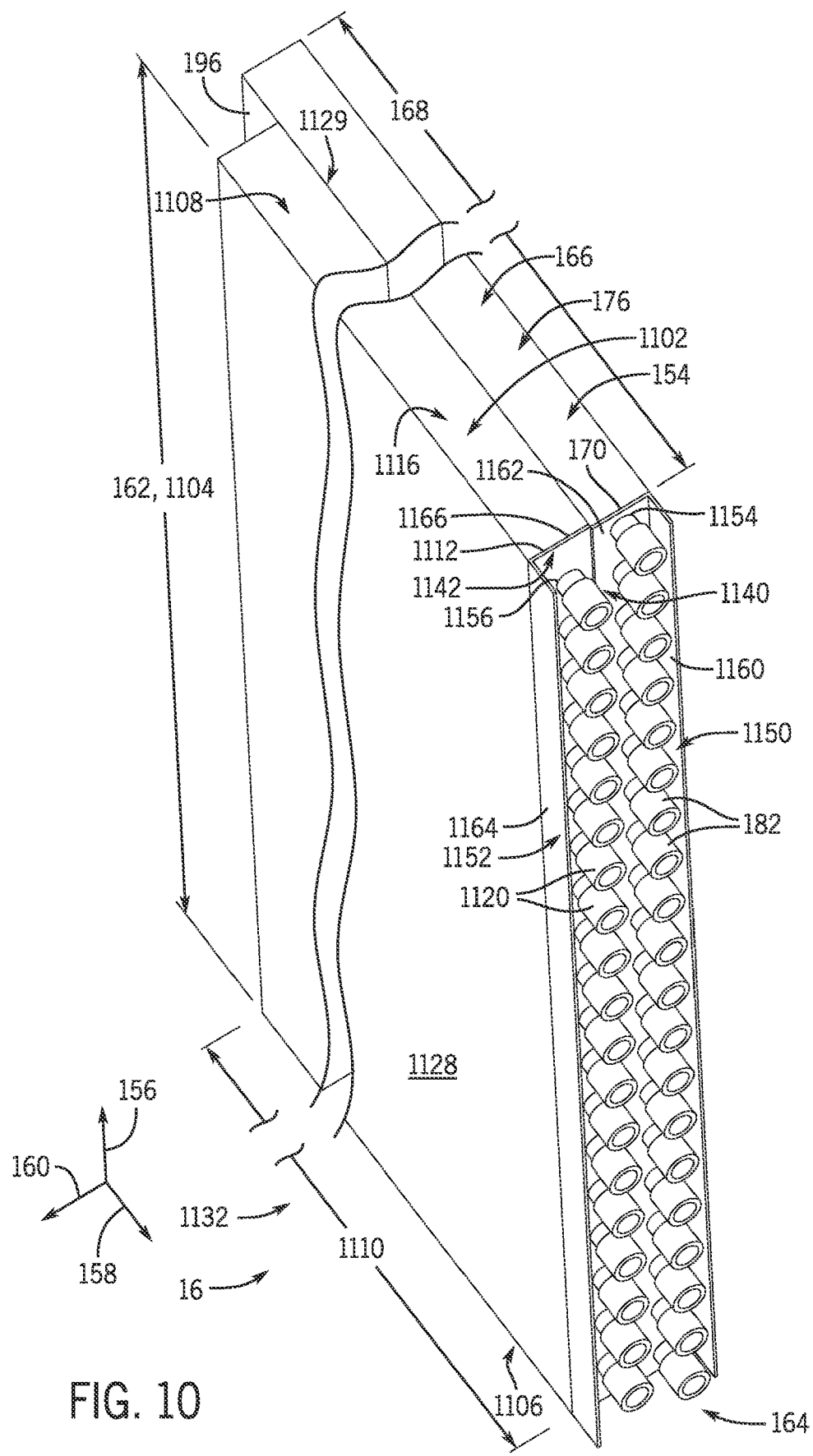
FIG. 10 is a perspective view of an embodiment of a portion of a heat exchanger assembly, illustrating slabs in a side-by-side configuration, in accordance with an aspect of the present disclosure.

Although the first end bracket 1150 and the second end bracket 1152 are shown as extending along respective heights 162, 1104 of the first slab 154 and the second slab 1102 in the illustrated embodiment of FIG. 10, in other embodiments, the first end bracket 1150, the second end bracket 1152, or both, may extend along a portion of the respective heights 162, 1104. Further, in certain embodiments, the first end bracket 1150, the second end bracket 1152, or both, may include a plurality of individual and/or separate end brackets having the features of the end brackets 1150, 1152 discussed herein. The first end bracket 1150 may include a first flange 1160 that extends from a first base portion 1162 of the first end bracket 1150, and the second end bracket 1152 may include a second flange 1164 that extends from a second base portion 1166 of the second end bracket 1152. As discussed below, the first and second flanges 1160, 1164 may facilitate coupling the first slab 154 and/or the second slab 1102 to other components of the HVAC system 11.

In some embodiments, the first height 162 of the first slab 154 may be substantially equal to (e.g., within a threshold percentage of) the second height 1104 of the second slab 1102. In the side-by-side configuration 1132, the first slab 154 and the second slab 1102 may be positioned such that the first side 164 of the first slab 154 is positioned adjacent (e.g., within a threshold distance of) the third side 1106 of the second slab 1102 and the second side 166 of the first slab 154 is positioned adjacent (e.g., within a threshold distance of) the fourth side 1108 of the second slab 1102. In other embodiments, the first side 164 and the third side 1106 and/or the second side 166 and the fourth side 1108 may be offset from one another in the side-by-side configuration 1132 of the heat exchanger assembly 16. Further, in certain embodiments, the first height 162 of the first slab 154 may be different than the second height 1104 of the second slab 1102.

Figure 11:
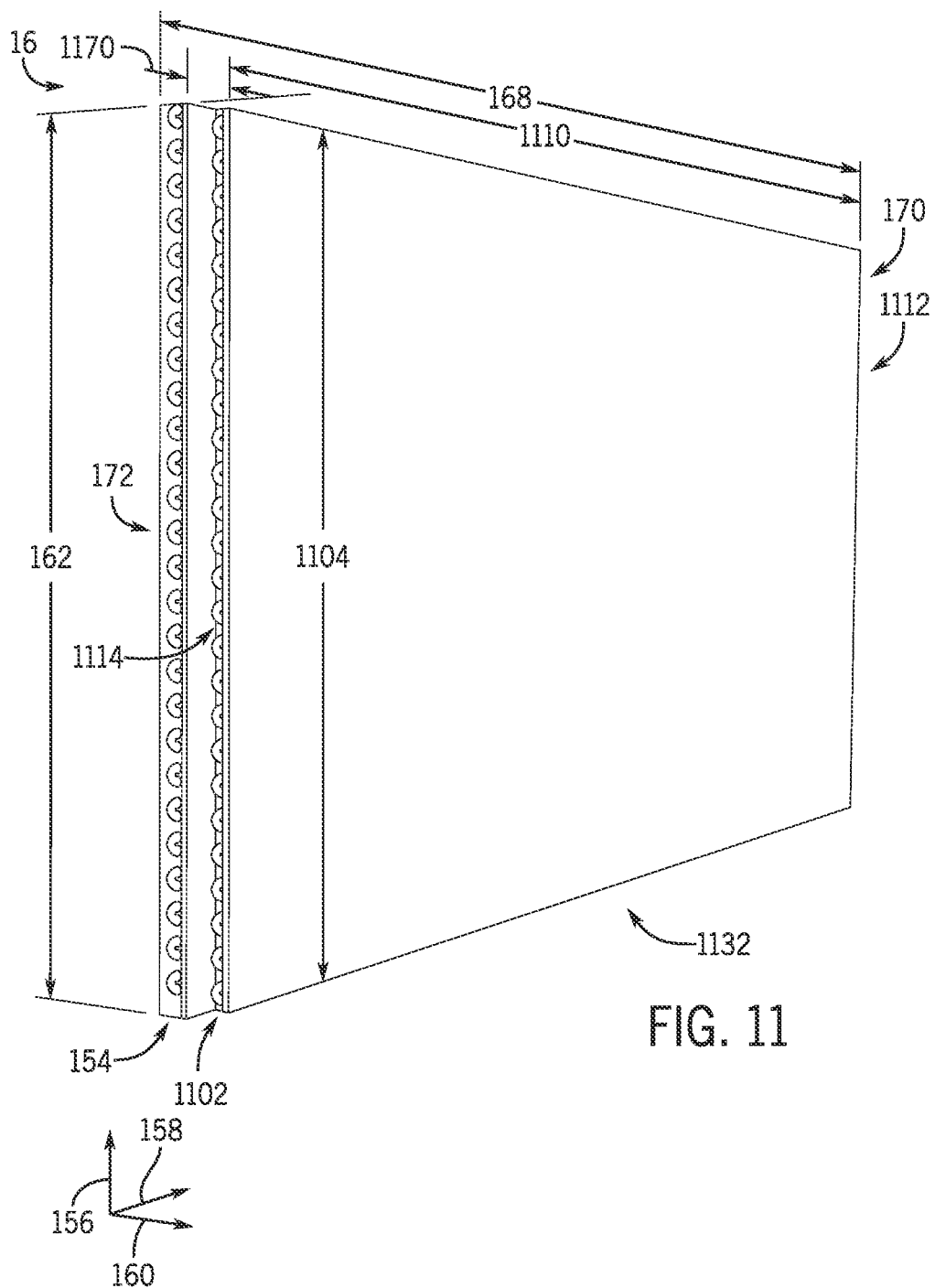
FIG. 11 is a perspective view of an embodiment of a heat exchanger assembly, illustrating slabs in a side-by-side configuration, in accordance with an aspect of the present disclosure.

FIG. 11 is a perspective view of an embodiment of the heat exchanger assembly 16 in the side-by-side configuration 1132. In the illustrated embodiment, in the side-by-side configuration 1132, the first slab 154 extends linearly along the first length 168 from the first end 170 to the second end 172 and the second slab 1102 extends linearly along the second length 1110 from the third end 1112 to the fourth end 1114. The first length 168 of the first slab 154 may be greater than (e.g., have a different magnitude than) the second length 1110 of the second slab 1102, such that the second end 172 of the first slab 154 is offset from the fourth end 1114 of the second slab 1102 by a gap 1170 (e.g., a distance, an offset distance, etc.). The gap 1170 may be a target dimension such as, for example, 1 inch, 2 inches, 5 includes, or more than 5 inches. The target dimension may correspond to positions of the first slab 154 and the second slab 1102 relative to one another in the bent configuration, as discussed below. As such, in the side-by-side configuration 1132, the first length 168 of the first slab 154 may define an overall length of the heat exchanger assembly 16, and the first height 162 and/or the second height 1104 may define an overall height of the heat exchanger assembly 16.

Figure 12:
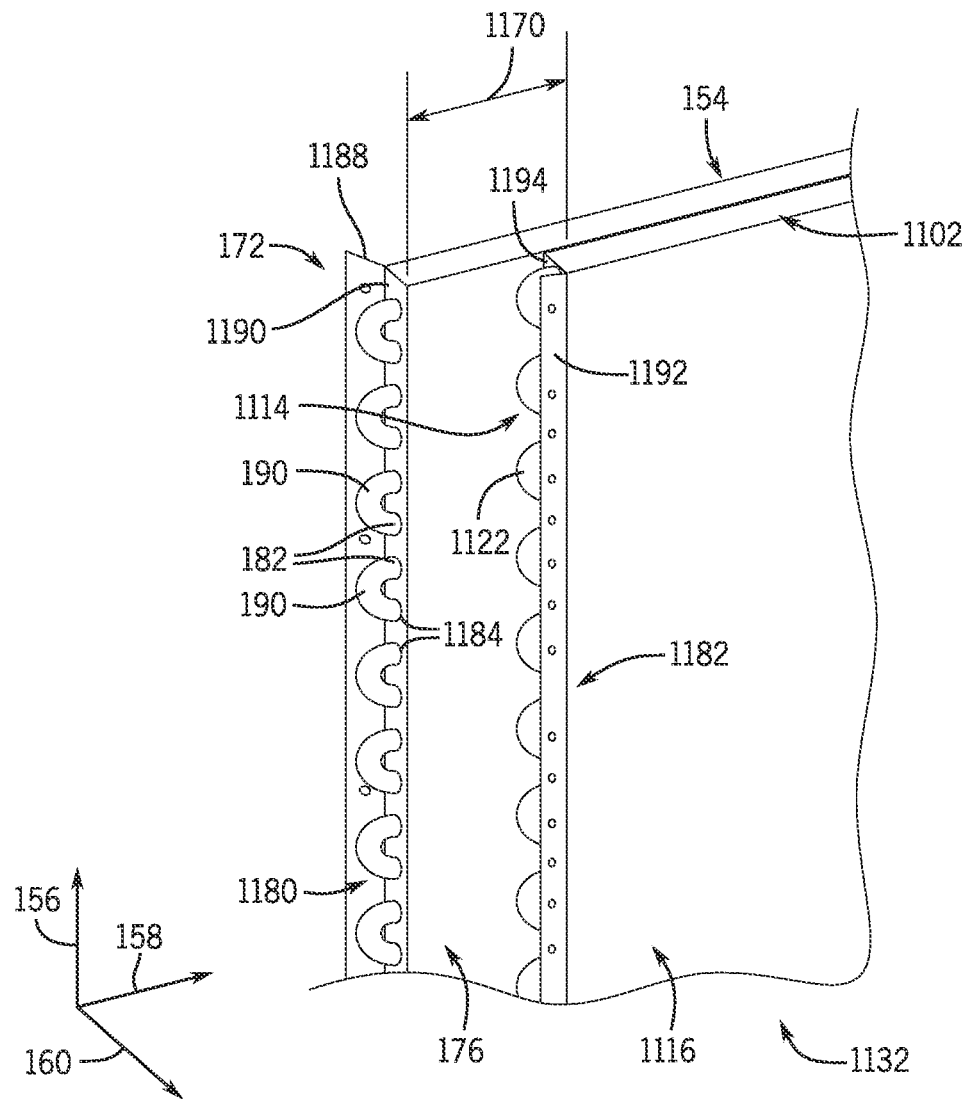
FIG. 12 is a perspective view of an embodiment of a portion of a heat exchanger assembly, illustrating slabs in a side-by-side configuration, in accordance with an aspect of the present disclosure.

FIG. 12 is an expanded perspective view of an embodiment of a portion of the heat exchanger assembly 16 in the side-by-side configuration 1132. In some embodiments, the second end 172 of the first slab 154 includes a third end bracket 1180 and the fourth end 1114 of the second slab 1102 includes a fourth end bracket 1182. The third end bracket 1180 may be coupled to or formed integrally with the first plurality of fins 176, and the fourth end bracket 1182 may be coupled to or formed integrally with the second plurality of fins 1116. The third end bracket 1180 includes one or more third bracket openings 1184 formed therein and configured to receive at least a subset of the first plurality of tubes 182. The fourth end bracket 1182 includes one or more fourth bracket openings 1186 (see FIG. 17) formed therein and configured to receive at least a subset of the second plurality of tubes 1120. In some embodiments, one or more of the first plurality of tubes 182 may be coupled to respective perimeters of the third bracket openings 1184 (e.g., using the tube expander 184) in addition to, or in lieu of, the first plurality of openings 180 of the first plurality of fins 176. Moreover, one or more of the second plurality of tubes 1120 may be coupled to respective perimeters of the fourth bracket openings 1186 (e.g., using the tube expander 184) in addition to, or in lieu of, the second plurality of openings 1118 of the second plurality of fins 1116.

In some embodiments, the third end bracket 1180 and the fourth end bracket 1182 may extend along all of or a portion of the respective heights 162, 1104 of the first slab 154 and the second slab 1102. In other embodiments, the third end bracket 1180, the fourth end bracket 1182, or both, may include a plurality of individual and/or separate end brackets each having the features of the end brackets 1180 and/or 1182 discussed herein. The third end bracket 1180 may include a third flange 1188 that extends from a third base portion 1190 of the third end bracket 1180, and the fourth end bracket 1182 may include a fourth flange 1192 that extends from a fourth base portion 1194 of the fourth end bracket 1182. As discussed below, the third and fourth flanges 1188, 1192 may facilitate coupling the first slab 154 and the second slab 1102 to other components of the HVAC system 11.

Figure 13:
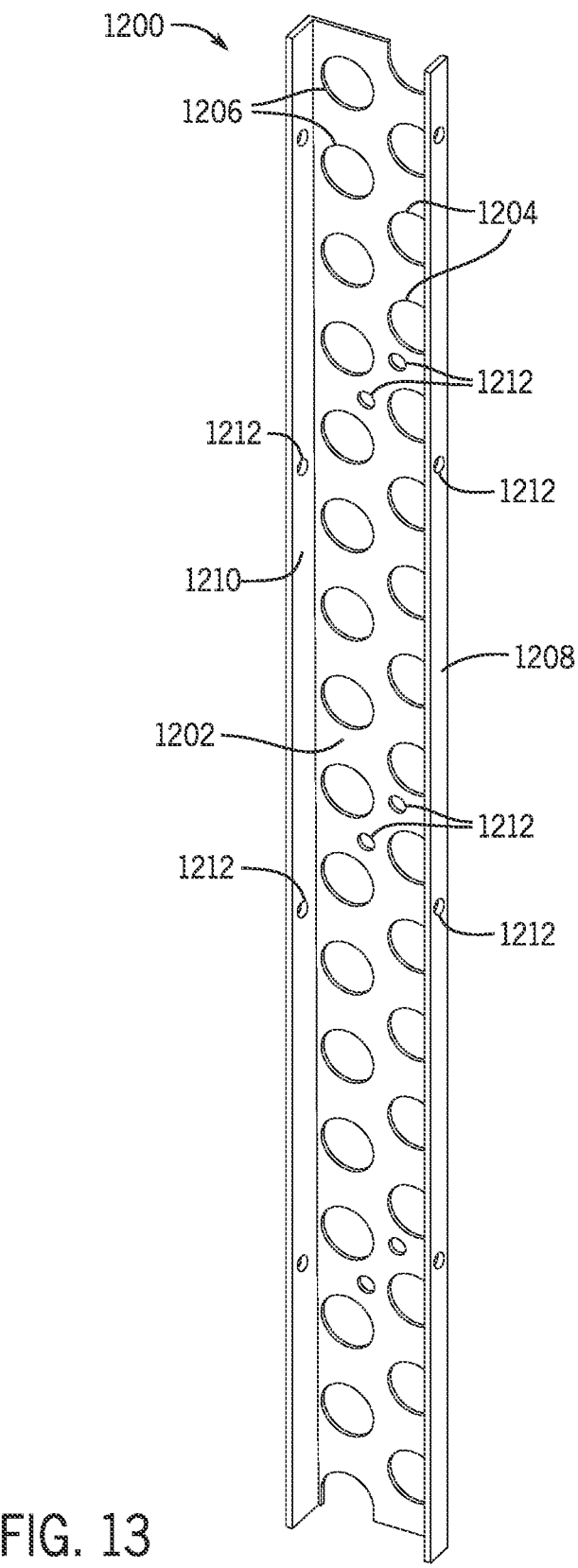
FIG. 13 is a perspective view of an embodiment of a connector of a heat exchanger assembly, in accordance with an aspect of the present disclosure.

FIG. 13 is a perspective view of an embodiment of a connector 1200 of the heat exchanger assembly 16. As discussed in detail below, the connector 1200 facilitates the coupling of the first slab 154 of the heat exchanger assembly 16 to the second slab 1102 of the heat exchanger assembly 16 and retaining the first and second slabs 154, 1102 in the side-by-side configuration 1132 (e.g., during a bending process). In the illustrated embodiment, the connector 1200 includes a central portion 1202 having a first plurality of receiving openings 1204 and a second plurality of receiving openings 1206 formed therein. As discussed below, in an installed configuration of the connector 1200 on the first and second slabs 154, 1102, the first plurality of receiving openings 1204 is configured to receive at least a subset of the first plurality of tubes 182, and the second plurality of receiving openings 1206 is configured to receive at least a subset of the second plurality of tubes 1120. The connector 1200 includes a first connector flange 1208 and a second connector flange 1210 that extend from the central portion 1202. In some embodiments, the first connector flange 1208, the second connector flange 1210, or both, may extend generally orthogonally from or cross-wise to the central portion 1202. In some embodiments, the connector 1200 includes fastener apertures 1212 formed within the central portion 1202, the first connector flange 1208, and/or the second connector flange 1210. As discussed below, the fastener apertures 1212 may facilitate the coupling of the connector 1200 to the first slab 154 and the second slab 1102 via suitable fasteners. In some embodiments, the connector 1200 may be formed from a single piece of material (e.g., sheet metal) to facilitate manufacturing of the connector 1200 and enhance a structural rigidity of the connector 1200.

As shown in FIG. 5, the process 150 includes securing (e.g., coupling) the connector 1200 to the first end 170 of the first slab 154 and the third end 1112 of the second slab 1102, as indicated by block 1220. The following discussion continues with reference to FIG. 14, which is a perspective view of an embodiment of the heat exchanger assembly 16, illustrating the connector 1200 in an installed configuration 1222 with the heat exchanger assembly 16. In the installed configuration 1222, the central portion 1202 of the connector 1200 may engage with (e.g., contact) the first base portion 1162 of the first end bracket 1150 and the second base portion 1166 of the second end bracket 1152, the first connector flange 1208 may engage with (e.g., contact) the first flange 1160 of the first end bracket 1150, and the second connector flange 1210 may engage with (e.g., contact) the second flange 1164 of the second end bracket 1152. Fasteners 1226 may be used to couple the central portion 1202 of the connector 1200 to the first base portion 1162 of the first end bracket 1150 and/or the second base portion 1166 of the second end bracket 1152, to couple the first connector flange 1208 of the connector 1200 to the first flange 1160 of the first end bracket 1150, and/or to couple the second connector flange 1210 of the connector 1200 to the second flange 1164 of the second end bracket 1152. Additionally or alternatively, the connector 1200 may be coupled to the first and second end brackets 1150, 1152 using adhesives (e.g., bonding glue) or a metallurgical process, such as welding or brazing. In any case, in the installed configuration 1222, the connector 1200 may retain a relative position of the first end 170 of the first slab 154 with respect to the second end of the second slab 1102. That is, the connector 1200 may ensure that the first end 170 remains aligned with the third end 1112 (e.g., along the lateral axis 160) while the first slab 154 and the second slab 1102 are in the side-by-side configuration 1132.

Figure 14:
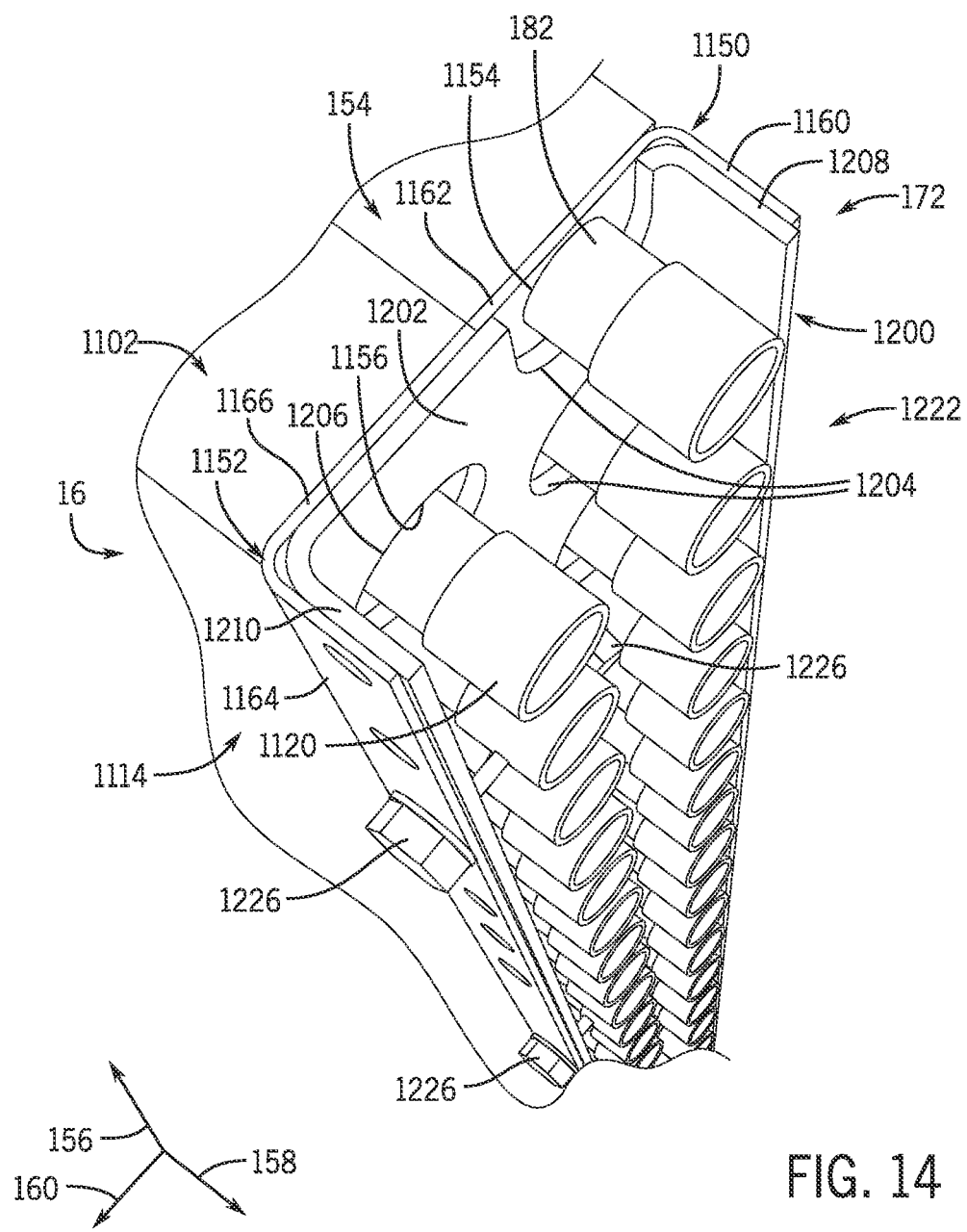
FIG. 14 is a perspective view of an embodiment of a portion of a heat exchanger assembly, illustrating slabs in a side-by-side configuration, in accordance with an aspect of the present disclosure.
Figure 15:
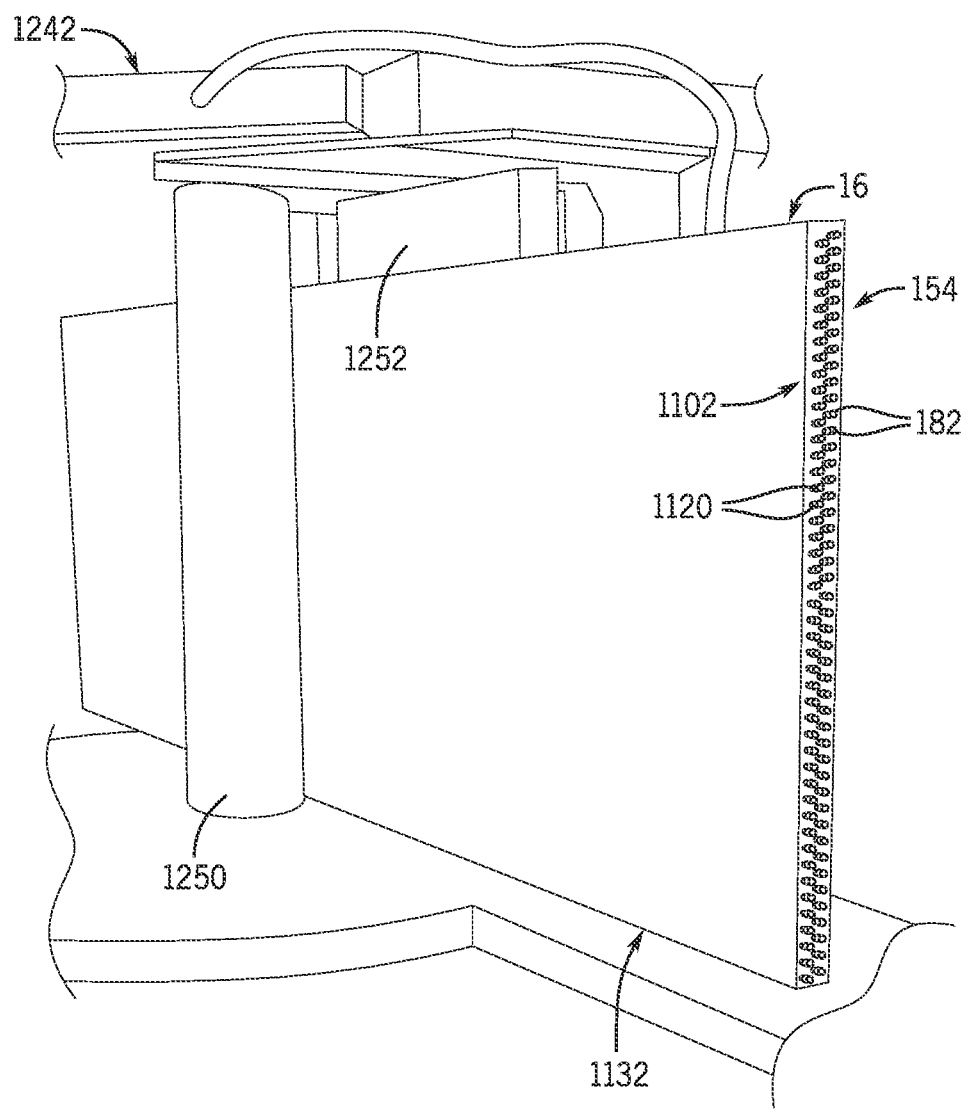
FIG. 15 is a perspective view of an embodiment of a heat exchanger assembly positioned in a bender, in accordance with an aspect of the present disclosure.

As shown in the illustrated embodiment of FIG. 14, in the installed configuration 1222 of the connector 1200, the first plurality of receiving openings 1204 may receive at least a subset of the first plurality of tubes 182, and the second plurality of receiving openings 1206 may receive at least a subset of a second plurality of tubes 1120 to enable coupling of the connector 1200 to the first and second slabs 154, 1102. In some embodiments, interior diameters of the first and second plurality of receiving openings 1204, 1206 may exceed respective exterior diameters of the first and second plurality of tubes 182, 1120, respectively, such that the first plurality of tubes 182 does not contact perimeters of the first plurality of receiving openings 1204 and the second plurality of tubes 1120 does not contact perimeters of the second plurality of receiving openings 1206. In certain embodiments, the tube expander 184 may be used in accordance with the techniques described above to form an interference fit between the first plurality of tubes 182 and the first plurality of receiving openings 1204, and between the second plurality of tubes 1120 and the second plurality of receiving openings 1206, upon installation of the connector 1200 with the heat exchanger assembly 16. In some embodiments, in the installed configuration 1222, the connector 1200 may extend along all of or a portion of the overall height (e.g., the first height 162 and/or the second height 1104) of the heat exchanger assembly 16. In certain embodiments, a plurality of individual connectors may be coupled to the first slab 154 and the second slab 1102 in lieu of the connector 1200.

As shown in the illustrated embodiment of FIG. 5, the process 150 includes bending the first slab 154 and the second slab 1102 together to form a bent configuration 1240 (see FIG. 16) of the heat exchanger assembly 16, as indicated by block 1238. The following discussion continues with reference to FIG. 15, which is a perspective view of an embodiment of the heat exchanger assembly 16 and a bender 1242 (e.g., a heat exchanger bender) that may be used to transition the heat exchanger assembly 16 to the bent configuration 1240. To transition the heat exchanger assembly 16 to the bent configuration 1240, the heat exchanger assembly 16 may be placed in the bender 1242 while in the side-by-side configuration 1132 and such that the second slab 1102 is positioned between the first slab 154 and a guide 1250 (e.g., a roller) of the bender 1242. The bender 1242 includes an actuator 1252 is configured to simultaneously bend (e.g., plastically deform) the second slab 1102 about the guide 1250 and bend (e.g., plastically deform) the first slab 154 about the second slab 1102. The bender 1242 may be configured to bend the first and second slabs 154, 1102 at one or more locations (e.g., discrete locations) to transition the heat exchanger assembly 16 to the bent configuration 1240 having a desired shape or profile.

Figure 16:
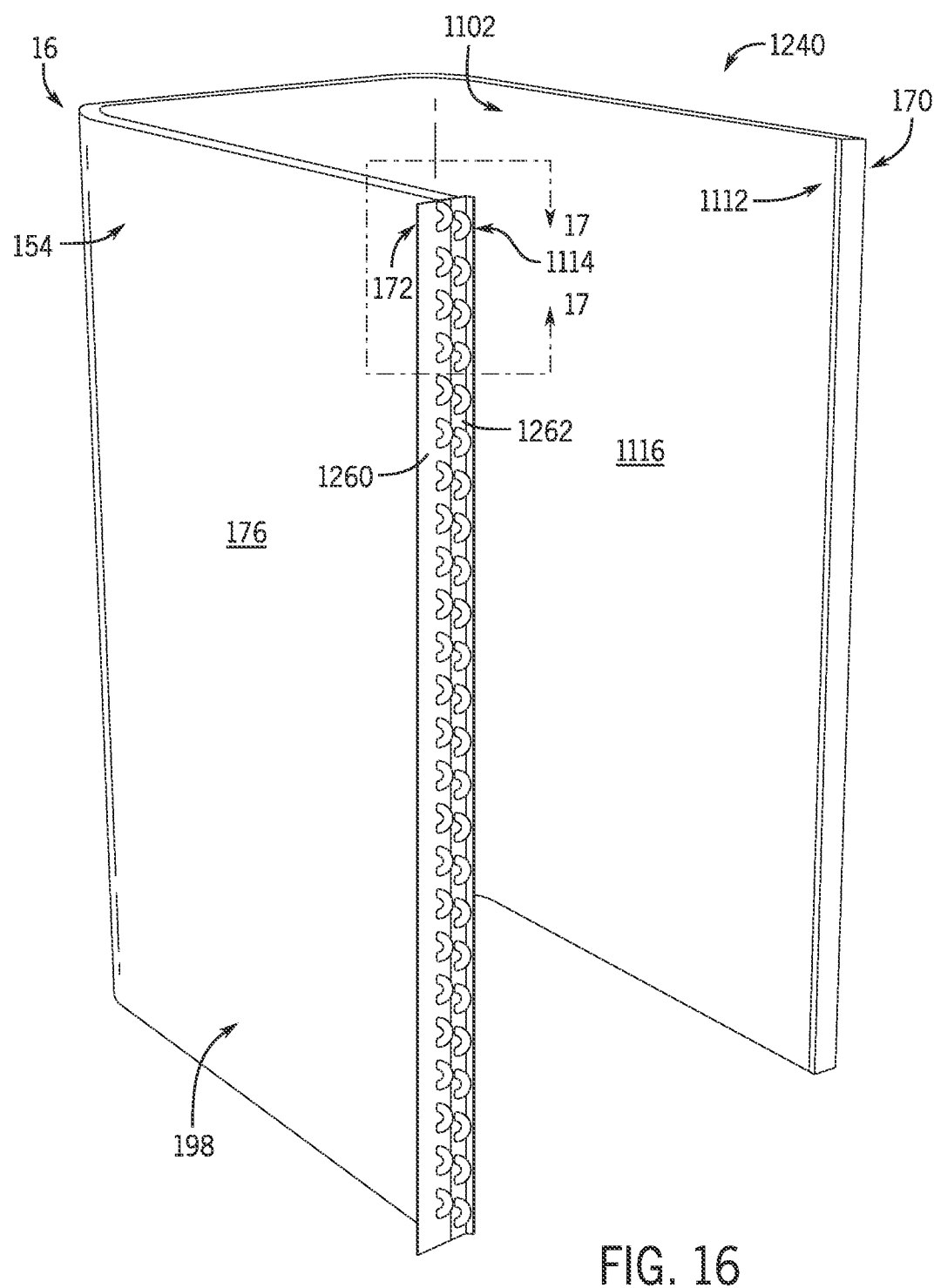
FIG. 16 is a perspective view of an embodiment of a heat exchanger assembly in a bent configuration, in accordance with an aspect of the present disclosure.

FIG. 16 is a perspective view of an embodiment of the heat exchanger assembly 16 in the bent configuration 1240, in which the first slab 154 is bent along the first length 168 and the second slab 1102 is bent along the second length 1110. In the bent configuration 1240, the first slab 154 may include a shape or profile extending along the first length 168 of the first slab 154 that is geometrically similar to a shape or profile extending along the second length 1110 of the second slab 1102. The gap 1170 (FIGS. 11 and 12) between the second end 172 of the first slab 154 and the fourth end 1114 of the second slab 1102 in the side-by-side configuration 1132 of the first and second slabs 154, 1102 may be sized such that, in the bent configuration 1240 of the heat exchanger assembly 16, the second end 172 of the first slab 154 is positioned adjacent (e.g., within a threshold distance of) the fourth end 1114 of the second slab 1102. That is, the first slab 154 and the second slab 1102 may be bent such that a third end face 1260 of the second end 172 is aligned (e.g., within a threshold degree of orientation, aligned along the lateral axis 160, etc.) with a fourth end face 1262 of the second slab 1102, and the gap 1170 is removed. It should be understood that the first slab 154 and the second slab 1102 may still be arranged side-by-side in the bent configuration 1240.

Although the heat exchanger assembly 16 includes a generally U-shaped profile in the illustrated embodiment of FIG. 16, it should be understood that, in other embodiments, the first and second slabs 154, 1102 may be bent such that the heat exchanger assembly 16 includes any other suitable shape or profile in the bent configuration 1240. For example, in some embodiments, the heat exchanger assembly 16 may include an S-shaped profile or another suitable profile in the bent configuration 1240. As such, in certain embodiments, the heat exchanger assembly 16 may include a shape or profile in which the first length 168 of the first slab 154 and the second length 1110 may be substantially equal to one another (e.g., within a threshold percentage of one another), while the first end 170 is aligned with the third end 1112 and the second end 172 is aligned with the fourth end 1114 (e.g., such as in the bent configuration 1240 of the heat exchanger assembly 16). Moreover, it should be understood that the first slab 154 remains positioned adjacent to (e.g., against) the second slab 1102 in the bent configuration 1240.

Figure 17:
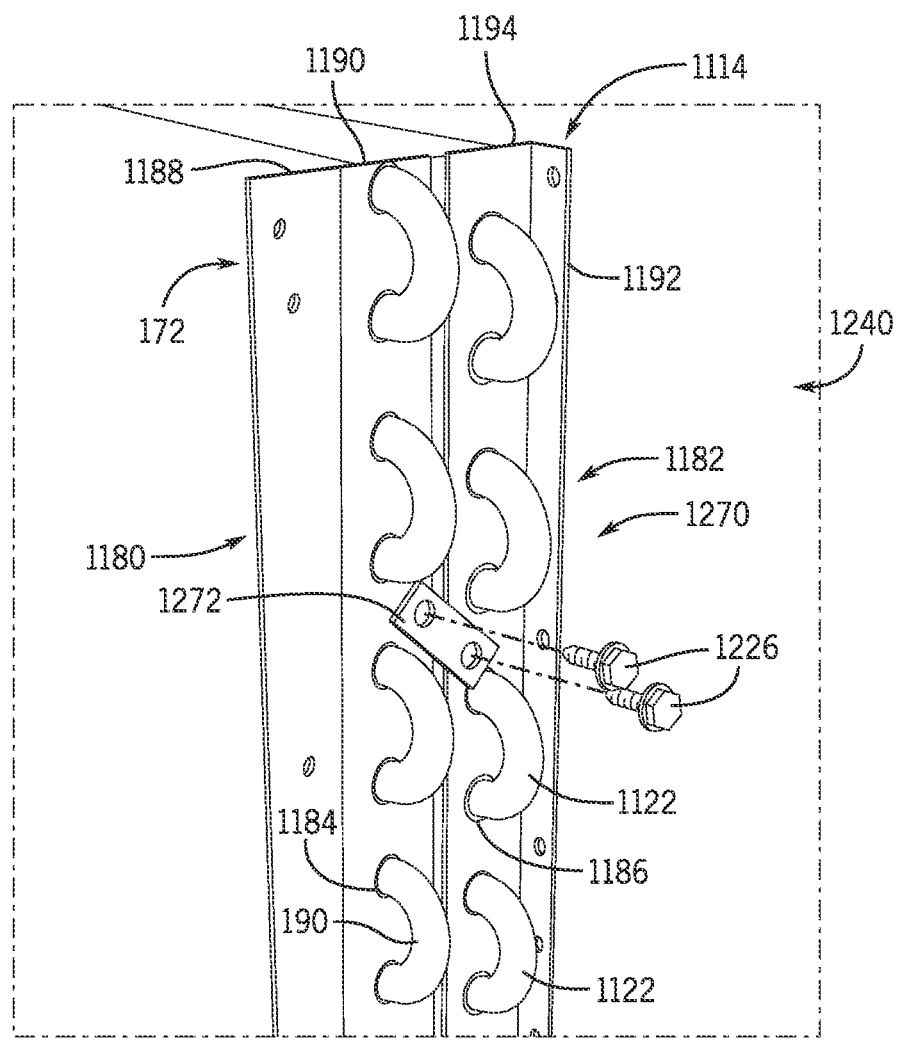
FIG. 17 is a perspective view of an embodiment of a portion of a heat exchanger in a bent configuration, in accordance with an aspect of the present disclosure.

FIG. 17 is an expanded perspective view of an embodiment of a portion of the heat exchanger assembly 16 in the bent configuration 1240, illustrating the second end 172 of the first slab 154 and the fourth end 1114 of the second slab 1102 in an aligned configuration 1270, in which the second end 172 is adjacent to the fourth end 1114 (e.g., aligned along the lateral axis 160). That is, in the aligned configuration 1270, a dimension of the gap 1170 between the second end 172 and the fourth end 1114 may be substantially zero. In some embodiments, the heat exchanger assembly 16 includes a brace 1272, or a plurality of braces, that is configured to couple the second end 172 and the fourth end 1114 to facilitate retaining the heat exchanger assembly 16 in the bent configuration 1240 and to enhance a structural rigidity of the heat exchanger assembly 16 in the bent configuration 1240. The brace 1272 may be coupled to the first slab 154 and the second slab 1102 via fasteners 1226, adhesives, and/or a metallurgical process.

Figure 18:
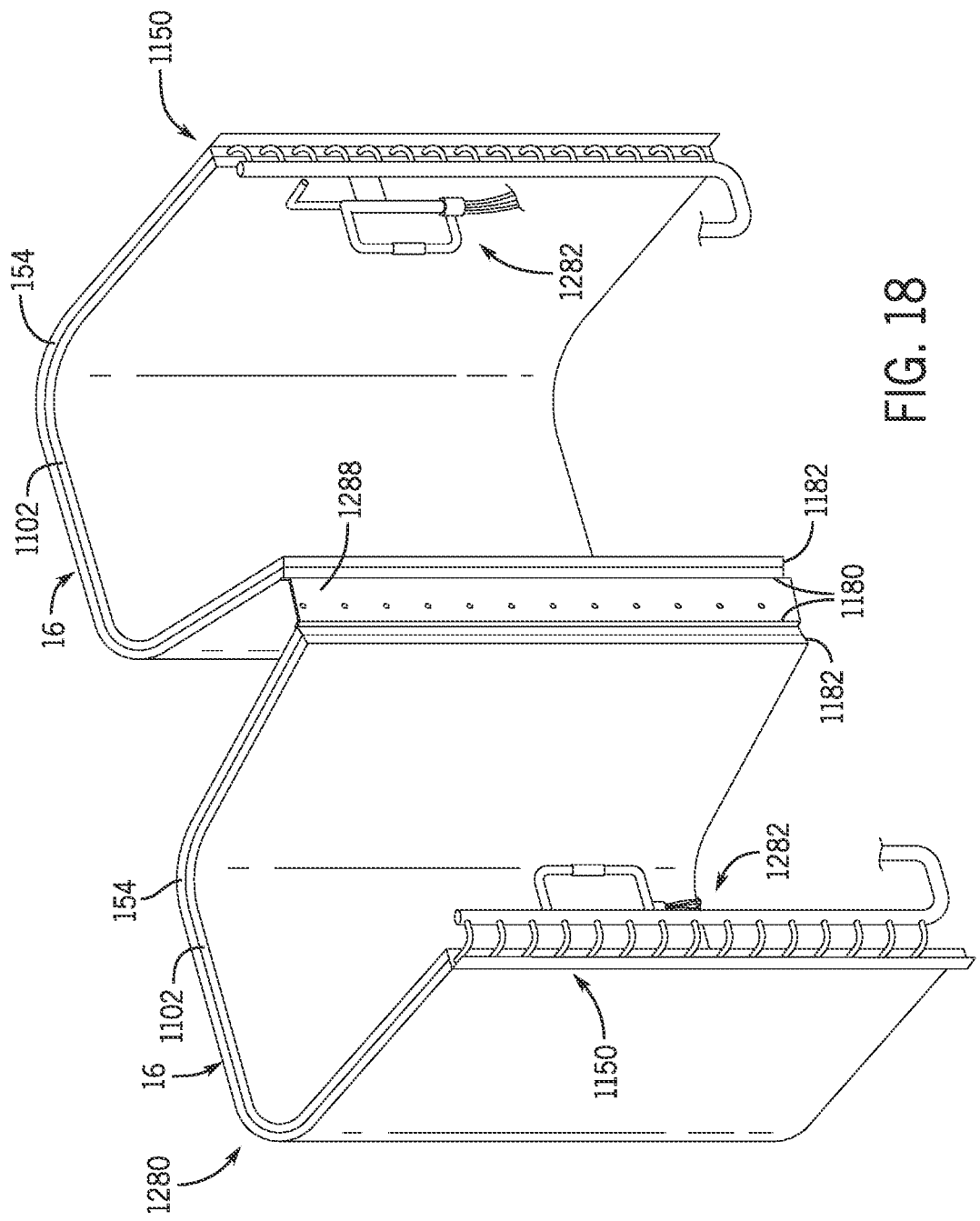
FIG. 18 is a perspective view of an embodiment of a heat exchanger system having a pair of heat exchanger assemblies, in accordance with an aspect of the present disclosure.

FIG. 18 is a perspective view of an embodiment of a heat exchanger system 1280 having a pair of heat exchanger assemblies 16 disposed adjacent to one another. In the illustrated embodiment, each of the heat exchanger assemblies 16 includes a respective header assembly 1282 (e.g., header manifolds) that may be supported by, for example, the first end brackets 1150 and/or the second end brackets 1152 of each of the heat exchanger assemblies 16, and that may be fluidly coupled to the first and second plurality of tubes 182, 1120 of each of the heat exchanger assemblies 16. In some embodiments, a coupling panel 1288 may be coupled to, for example, the third end brackets 1180 of each of the heat exchanger assemblies 16 to cover a gap extending between the heat exchanger assemblies 16.

As set forth above, embodiments of the present disclosure may provide one or more technical effects useful for manufacture and assembly of a bent, multi-slab heat exchanger assembly that has an enhanced heat transfer capacity and reduced overall exterior length as compared to a linear heat exchanger assembly. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of manufacturing a heat exchanger, the method comprising:
    providing a first slab comprising a first plurality of tubes extending through a first plurality of fins, wherein the first plurality of tubes extends from a first end to a second end of the first slab along a first length of the first slab, wherein the first slab comprises a first face that extends along the first length between the first end and the second end;
    providing a second slab comprising a second plurality of tubes extending through a second plurality of fins, wherein the second plurality of tubes extends from a third end to a fourth end of the second slab along a second length of the second slab, wherein the second length of the second slab is different than the first length of the first slab, and the second slab comprises a second face that extends along the second length between the third end and the fourth end;
    positioning the first face of the first slab adjacent to the second face of the second slab in a side-by-side configuration, wherein, in the side-by-side configuration, the first end of the first slab is aligned with the third end of the second slab along a lateral axis extending crosswise to the first length and the second length;
    securing a connector to the first end of the first slab and to the third end of the second slab in the side-by-side configuration; and
    after securing the connector to the first end of the first slab and to the third end of the second slab, bending the first slab and the second slab together in the side-by-side configuration to form a bent configuration of the heat exchanger, wherein the second end of the first slab and the fourth end of the second slab are aligned with one another in the bent configuration.

2. The method of claim 1, wherein the first slab extends linearly along the first length from the first end to the second end, and the second slab extends linearly along the second length from the third end to the fourth end in the side-by-side configuration.

3. The method of claim 1, comprising securing a brace to the second end of the first slab and to the fourth end of the second slab with the heat exchanger in the bent configuration.

4. The method of claim 1, comprising securing a first end bracket to the first end of the first slab and securing a second end bracket to the third end of the second slab.

5. The method of claim 4, wherein securing the connector to the first end and to the third end comprises securing the connector to the first end bracket and to the second end bracket.

6. The method of claim 1, comprising:
forming the connector from a single piece of material;
forming a plurality of openings in the single piece of material;
positioning the first plurality of tubes within a first subset of the plurality of openings; and
positioning the second plurality of tubes within a second subset of the plurality of openings.

7. The method of claim 1, wherein providing the first slab comprises:
positioning the first plurality of tubes within a first plurality of openings of the first plurality of fins; and
expanding the first plurality of tubes within the first plurality of openings via a tube expander to secure the first plurality of tubes to the first plurality of fins via an interference fit.

8. The method of claim 7, wherein providing the second slab comprises:
positioning the second plurality of tubes within a second plurality of openings of the second plurality of fins; and
expanding the second plurality of tubes within the second plurality of openings via the tube expander to secure the second plurality of tubes to the second plurality of fins via an interference fit.

9. The method of claim 1, wherein bending the first slab and the second slab together in the side-by-side configuration comprises bending, via an actuator of a heat exchanger bender, the second slab about a guide of the heat exchanger bender and bending the first slab about the second slab to transition the heat exchanger to the bent configuration.

10. A method of manufacturing a heat exchanger, the method comprising:
providing a first slab comprising a first plurality of tubes extending from a first end to a second end of the first slab along a first length of the first slab, wherein the first slab comprises a first face extending along the first length between the first end and the second end;
providing a second slab comprising a second plurality of tubes extending from a third end to a fourth end of the second slab along a second length of the second slab, wherein the second length is different than the first length, and the second slab comprises a second face extending along the second length between the third end and the fourth end;
positioning the first face of the first slab adjacent to the second face of the second slab in a side-by-side configuration, wherein, in the side-by-side configuration, the first end of the first slab is aligned with the third end of the second slab along a lateral axis extending crosswise to the first length and the second length;
securing a connector to the first end of the first slab and to the third end of the second slab in the side-by-side configuration; and
after securing the connector to the first end of the first slab and to the third end of the second slab, bending the first slab and the second slab together in the side-by-side configuration to form a bent configuration of the heat exchanger, wherein the second end of the first slab and the fourth end of the second slab are aligned with one another in the bent configuration.

11. The method of claim 10, wherein providing the first slab comprises forming the first slab at the first length, and providing the second slab comprises forming the second slab at the second length.

12. The method of claim 10, wherein providing the first slab comprises extending the first plurality of tubes through corresponding openings of a plurality of fins and coupling at least a subset of the first plurality of tubes to the corresponding openings via an interference fit.

13. The method of claim 10, wherein bending the first slab and the second slab together comprises bending the second slab about a guide of a heat exchanger bender and bending the first slab about the second slab.

14. The method of claim 10, comprising securing a brace to the second end of the first slab and to the fourth end of the second slab with the heat exchanger in the bent configuration.

15. The method of claim 10, comprising securing a first end bracket to the first end of the first slab and securing a second end bracket to the third end of the second slab.

16. The method of claim 15, wherein securing the connector to the first end and to the third end comprises securing the connector to the first end bracket and to the second end bracket.

17. The method of claim 1, wherein the first end of the first slab is aligned with the third end of the second slab in the side-by-side configuration.

* * * * *